T. P. TAYLOR.
ABDOMEN COMPRESS.
APPLICATION FILED NOV. 10, 1908.
915,049.
Patented Mar. 9, 1909.
3 SHEETS—SHEET 2.
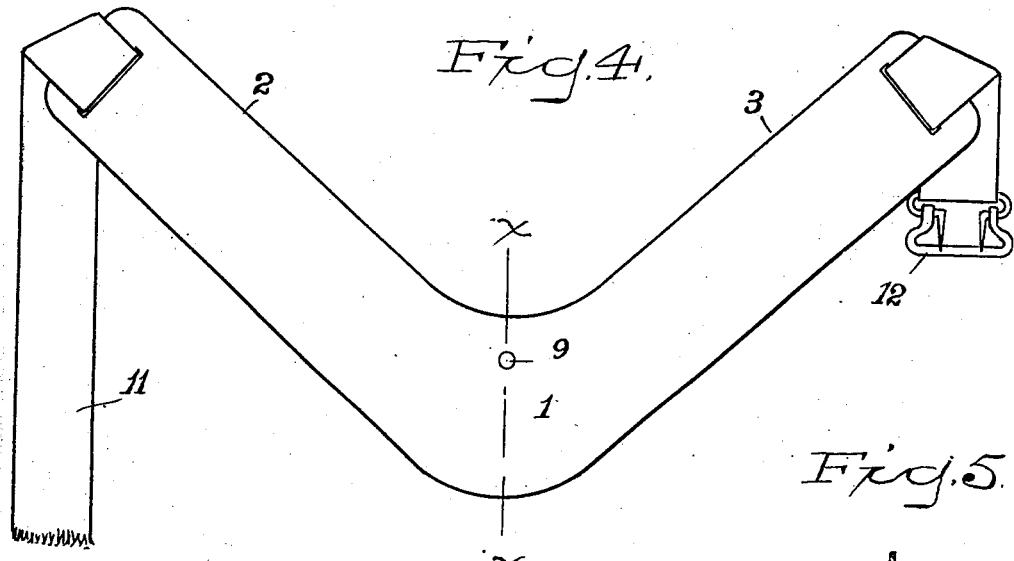
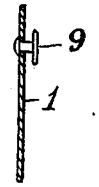
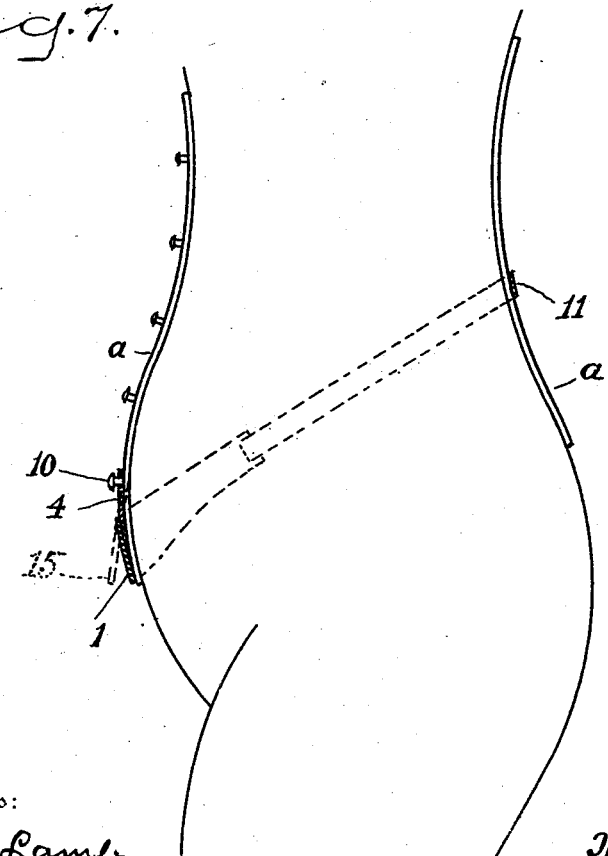
Witnesses:
H. H. Lamb
M. J. Longden
Inventor
Thomas P. Taylor
By Attorney

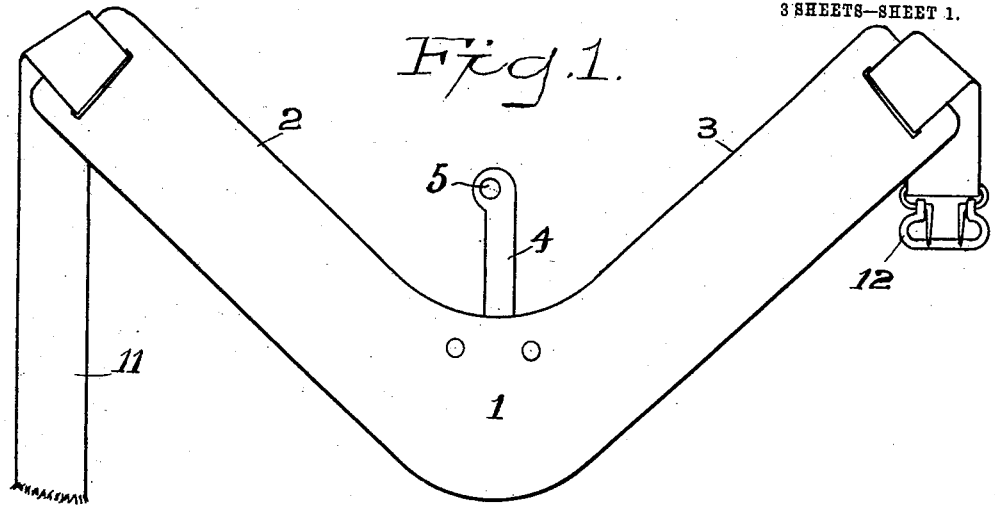
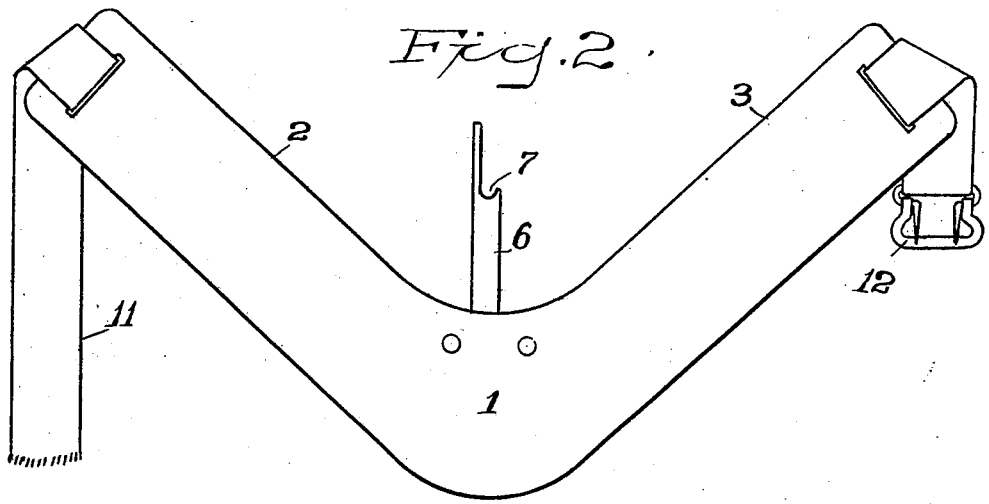
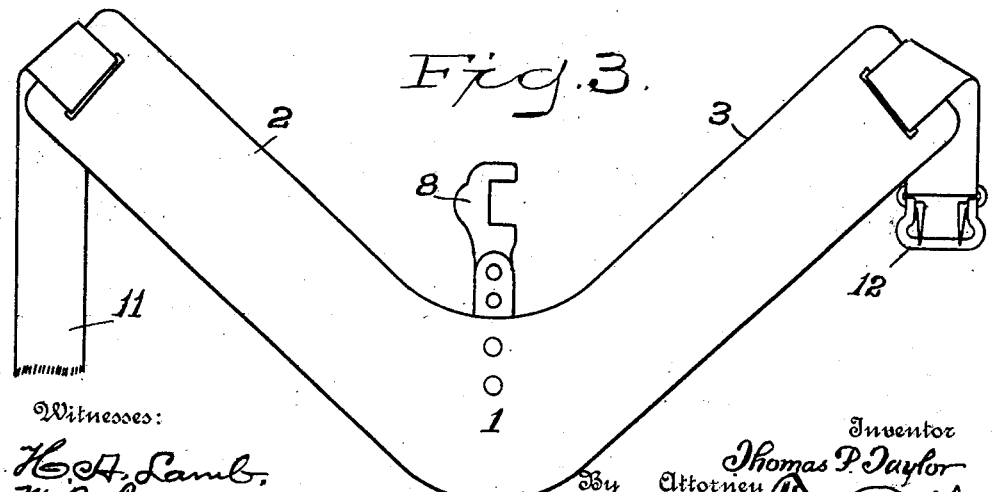

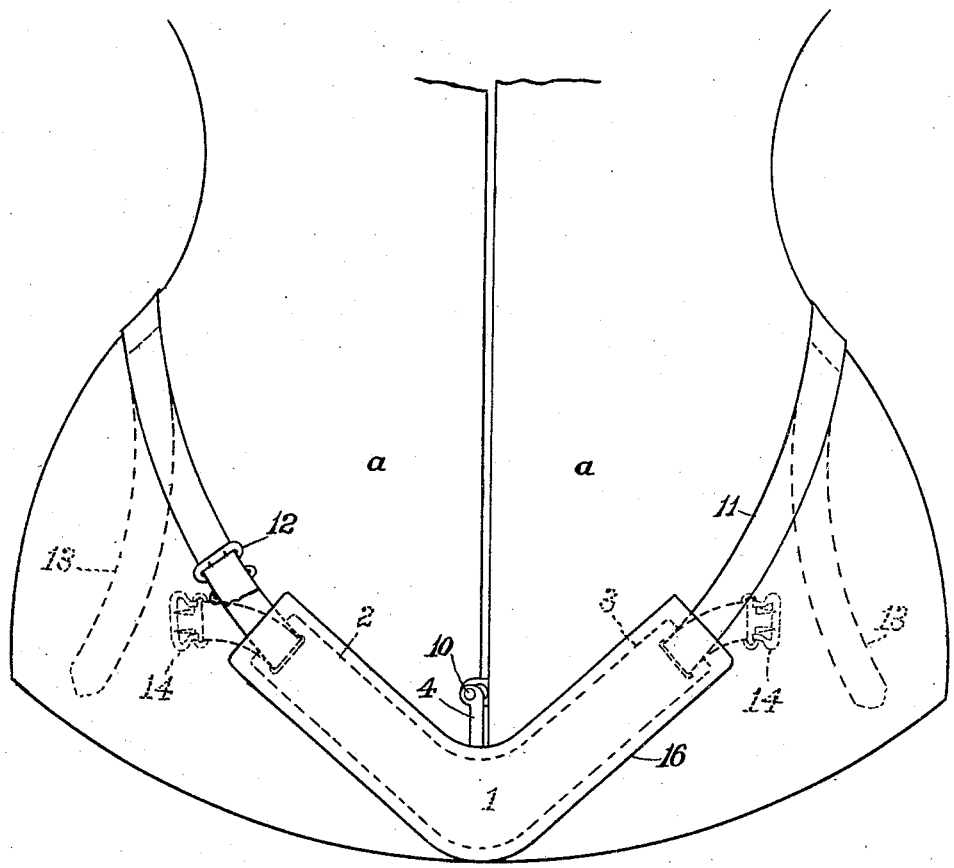

UNITED STATES PATENT OFFICE.

THOMAS P. TAYLOR, OF BRIDGEPORT, CONNECTICUT.

ABDOMEN-COMPRESS.

No. 915,049.

Specification of Letters Patent.

Patented March 9, 1909.

Application filed November 10, 1908. Serial No. 461,912.

*To all whom it may concern:*

Be it known that I, THOMAS P. TAYLOR, a citizen of the United States, residing at Bridgeport, in the county of Fairfield and State of Connecticut, have invented certain new and useful Improvements in Abdomen-Compresses; and I do hereby declare the following to be a full, clear, and exact description of the invention, such as will enable others skilled in the art to which it appertains to make and use the same.

My invention relates to certain new and useful improvements in abdomen compresses, and has for its object to provide a device of this description which shall be applied and operated without the aid of any hose supporters whatsoever, and with this end in view my invention consists in certain details of construction hereinafter fully set forth and then particularly pointed out in the claim which conclude this description.

In the accompanying drawing Figures 1, 2, 3, and 4, are elevations showing my improved compress equipped with various well known fixtures for connection with a corset—Fig. 5 a section at the line $x$, $x$, of Fig. 4—Fig. 6 a front elevation showing my improvement applied in position upon a corset, and Fig. 7 a vertical central section of my improvement as it appears when in use on a corset, the latter being illustrated upon a human body shown in outline.

Similar characters of reference denote like parts in the several figures of the drawing.

My present invention comprises a one piece sheet structure preferably of metal, thin and resilient, having a general V-shape and provided with certain means to engage with the corset whereby the device cannot ride upwardly and will always lie normally immediately in front of the lower central portion of the hypogastric region of the abdomen, while a waist strap connected with the ends of the device is employed to pull the latter close to the form of the wearer, all of which will be understood from the following description:—

1 is a thin integral sheet structure preferably of metal, resilient in its nature, and having a general V-shape and of a suitable width. The laterally extending portions 2, 3, diverge upwardly, so that when in position on the wearer they point toward the hips.

It is necessary to equip the structure 1 with some means whereby it may be secured to a corset in such manner as to prevent any upward movement, and I have shown several ways to accomplish this result. At Fig. 1 I have shown the structure equipped with a finger 4 projecting upwardly and having a perforation 5 for engagement over the stud of a corset; in Fig. 2 I have shown a finger 6 projecting from the structure and provided with a recess 7 which is adapted to engage against the lower portion of the stud of a corset while the extremity of the finger is narrowed so that it can readily pass between the elements of a corset clasp and assist in holding the structure in proper position; at Fig. 3 I have shown the structure equipped with a well known fastener 8 which is adapted to be engaged with the loop of a corset clasp; and at Figs. 4 and 5 I have illustrated the structure equipped with a stud 9 projecting from the rear of such structure and adapted to be engaged with the corset between the busks thereof. All of these fixtures 4, 6, 8, and 9, are well known devices that have heretofore been used in connection with combined abdomen compresses and hose supporters, and therefore I lay no claim to the same herein since it is merely necessary that my improvement should be equipped with some sort of fixture to engage with the corset and prevent upward movement.

At Fig. 6 I have illustrated the form of my improvement shown at Fig. 1 applied to a corset $a$, the finger 4 being engaged over the stud 10 of the corset clasp, while a strap 11 secured to the lateral extension 3 is passed around the waist line of the corset and secured at a proper tension to a buckle 12 carried by the lateral extension 2.

Of course, if desired, straps may be attached directly to the corset as shown in dotted lines at 13 and engage with buckles, shown in dotted lines at 14, carried by the lateral extensions, so as to properly secure my improvement at the necessary tension, and I therefore do not wish to be limited to any particular form of attaching straps.

My improvement must be engaged with the lowermost stud of the corset so that the structure 1 will cover the lower ends of the corset steels, and when in this position such structure is immediately in front of the lower central portion of the hypogastric region of the abdomen, while the middle and upper portions of the abdomen are perfectly free from any direct pressure that might be brought about by using my improvement.

Ordinarily the steels of a corset at their lower ends extend outwardly from the form of the wearer, as shown at 15 in dotted lines at Fig. 7, but when my improvement is applied to a corset and the attaching straps tightly drawn, the lowermost portion or apex of the V-shaped structure 1 will be pulled inwardly and will thereby force the steels firmly against the body of the wearer and exert an upward pressure against the lower part of the abdomen. This inward pressure, without the aid of any hose supporters, is due to the fact that the structure 1 has sufficient width and diverges laterally toward the hips of the wearer, while the attaching straps which extend from a location above the hips tend to pull these lateral extensions upwardly thereby imparting a torsional twist to said structure and throwing the lower portion of the same inwardly.

Of course the metal structure 1 may be inclosed by any suitable fabric 16 as is shown at Fig. 6, where the structure 1 appears in dotted lines, but this is not necessary although it might be advisable in some instances in order to prevent the soiling of the corset or other clothing.

My improvement of course does not interfere with the attaching of the hose supporter tapes to the corset in the usual manner, but I want it distinctly understood that hose supporters are not at all necessary for the proper operation of my present improvement.

The fixtures which I employ for attaching my improvement to a corset are perfectly rigid, and the width and area of the metal structure are such that the tightening of the attaching straps will bring about a firm and constant pressure against the lower portion of the abdomen, and this is a great advantage, since in structures that depend upon the coöperation of the hose supporter tapes, the slackening of the latter will relax the pressure against the body.

Having thus described my invention what I claim as new and desire to secure by Letters Patent is:—

An abdomen compress comprising a thin resilient one piece sheet structure of suitable width having a general V-shape and provided with means for attachment to a corset whereby such structure is prevented from riding upwardly, the lateral integral extensions of such structure when thus applied to a corset pointing upwardly and outwardly toward the hips, and straps engaging said extensions from the waist line of the wearer whereby a torsional twist may be imparted to said structure thereby pulling the latter firmly against the form of the wearer.

In testimony whereof I affix my signature in presence of two witnesses.

THOMAS P. TAYLOR.

Witnesses:
   F. W. SMITH, Jr.,
   M. T. LONGDEN.